United States Patent

[11] 3,543,724

[72] Inventors Max B. Kirkpatrick
Anchorage, Alaska;
Andrew G. Harvey, and John M. Sparks III
Box 1509, Wickenburg, Arizona 85358
[21] Appl. No. 683,719
[22] Filed Nov. 16, 1967
[45] Patented Dec. 1, 1970

[54] MONITORED AND CONTROLLED CONDITIONING AND EXERCISE METHOD FOR ANIMALS
18 Claims, 10 Drawing Figs.
[52] U.S. Cl. .................................................. 119/29;
73/379; 119/158; 128/2.05, 128/2.06; 272/57
[51] Int. Cl. ........................................................ A01k 15/00
[50] Field of Search............................................. 128/25,
2.06, 24; 272/69, 57; 119/29, 1

[56] References Cited
UNITED STATES PATENTS

| | | | |
|---|---|---|---|
| 2,611,341 | 9/1952 | Paris.............................. | 119/158 |
| 2,848,992 | 8/1958 | Pigeon........................... | 128/2.05 |
| 3,195,534 | 7/1965 | Bethke.......................... | 128/2.06 |
| 3,285,070 | 11/1966 | McDonough................ | 73/379 |
| 3,342,176 | 9/1967 | Kaplan et al.................. | 128/2.06 |
| 3,395,698 | 8/1968 | Morehouse.................... | 272/57X |
| 3,404,678 | 10/1968 | Von Ardenne................ | 128/2.06X |

Primary Examiner—Aldrich F. Medbery
Attorney—Strauch, Nolan, Neale, Nies and Kurz ABSTRACT: A method of producing an animal such as a race horse capable of optimum performance comprises selection of an animal having an adequately large heart at an early age so that training may start during the formative years, placing the animal on a known analysis highly digestible diet and making blood and related analysis to determine the normal equilibrium of the particular animal in respect to various physiological characteristics involved in conditioning and exercise, checking the animal for normal weight during this equilibrium period, and conditioning the animal by causing it to cyclically undergo swimming periods of vigorous exercise spaced by partial recovery intervals, all the while during such conditioning monitoring the animal's heart action to determine the timing of the exercise periods and recovery intervals to thereby prevent the heart rate from rising above safe values during the exercise periods and insure that each exercise period of a cycle is started before full recovery to normal heart rate, and monitoring the animal's weight by measuring it at the beginning of each day's exercise to correlate it with normal and the animal's diet and enable the conditioning cycle to be terminated in time to prevent the existence of excessive energy requirements which might cause excessive tissue damage.

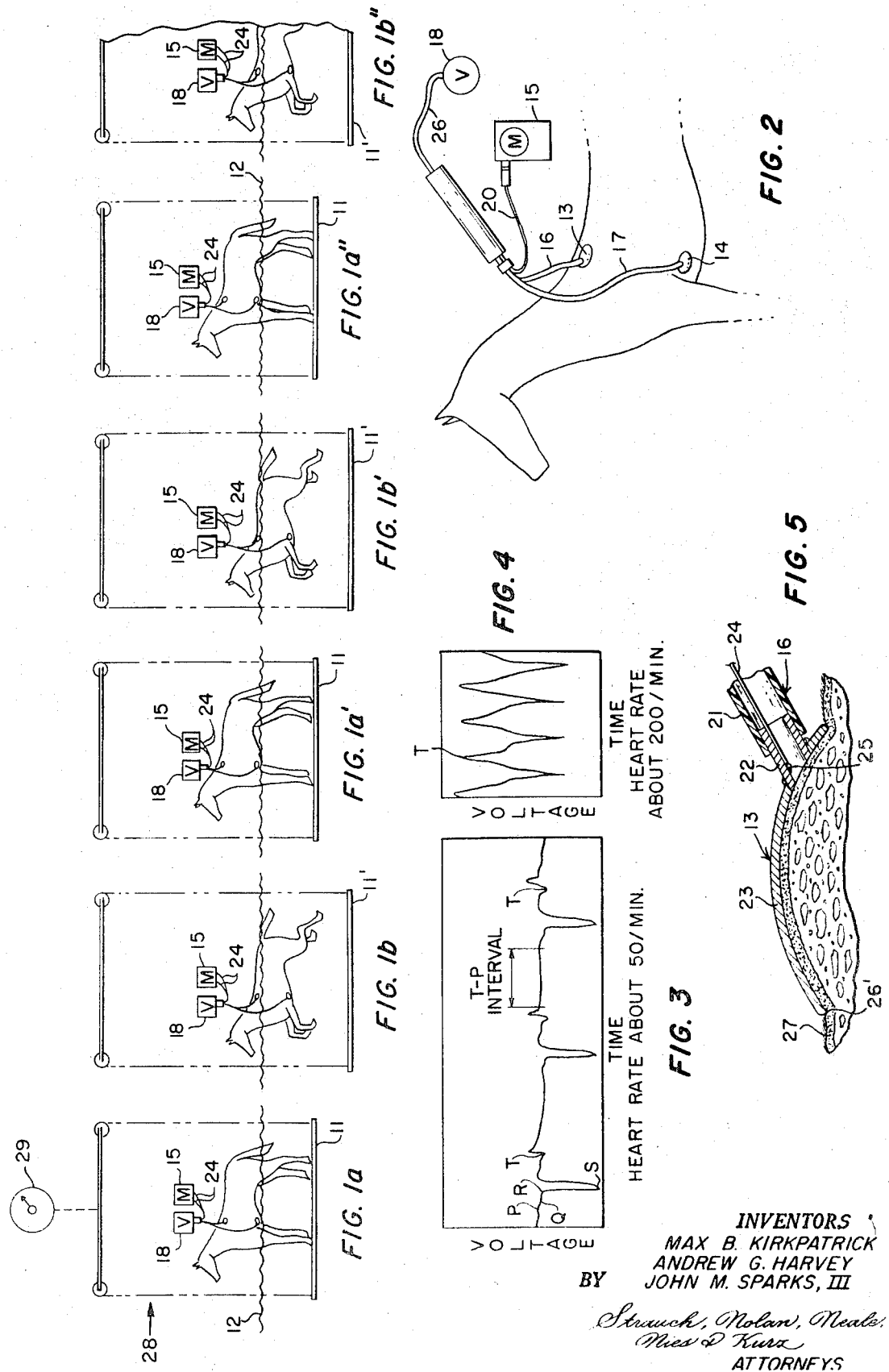

MONITORED AND CONTROLLED CONDITIONING AND EXERCISE METHOD FOR ANIMALS

BACKGROUND AND SUMMARY OF INVENTION

The invention relates to the selection and controlled conditioning of animals, particularly race horses although most basic aspects may be applied to humans.

Prior to the invention it has always been common practice to condition and train horses for racing using traditional methods which vary widely between individual trainers but in all of which the horses are exercised by actual running and their condition ascertained only by visual observation and/or by feeling chest and leg muscles. Experience has shown that horses undergoing such training are likely to accidentally physically injure their legs in one way or another during running, usually because of early fatigue due to poor or inadequate conditioning. Furthermore, there is no way to accurately discover during such training whether the horse is being exercised excessively or in such manner as to cause internal damage.

As a result of these haphazard training methods, many capable horses suffer premature injury and never reach the track, and many of those who do reach the track are so overtrained as not to be in optimum condition at the time.

Diets have long been known to be important or even essential, and again there are many different diets for race horses. To our knowledge however, none of these diets have been preceded by a physiological study of the particular animal including a determination of any diet deficiency in the food and correction of that deficiency prior to conditioning.

The invention provides for the first time for the proper selection of animals, the most advantageous mode of preparing the selected animal for actual conditioning, and an optimum substantially injury-free conditioning exercise program wherein the animal is continually monitored to prevent excesses, and such is the major object.

An essential object of the invention is to provide controlled cyclic conditioning exercise of the animal monitored to prevent overtraining, this comprising vigorously exercising the animal during periods of high heart beat near but under safe values determined by test on the particular animal, such periods being spaced by nonexercising recovery intervals during which the heart beat is allowed to drop to a safe value for resuming the exercise, while continually monitoring the animal's heart action to determine the length of these periods and intervals. An attendant object of the invention is to monitor the animal's weight during conditioning, usually weighing it at the beginning of each day's exercise period to correlate the loss of weight caused by exercise with food intake and prevent muscle and like tissue deterioration due to overexercise.

The invention will be explained in detail with regard to race horse training which is its preferred application.

The first step is the proper selection of a colt. It is preferable to select colts at the age of 6 months. It is known that a horse's heart size changes between birth and the age of 18 months more than at any other time. For this reason, it is important under the invention that concentrated exercise occurs from weaning (6 months) to age two. However the invention may be applied to horses of any racing age. For purposes of simplicity the term includes colts.

The two major factors in selection are conformation and size of the heart as determined by observation of an electrocardiogram and measurement of the width of the QRS complex. The QRS width is the time an electrical impulse takes to travel through the muscle mass of the ventricles and this width is directly proportional to the muscle mass of the heart ventricles and therefore it is a measure of heart size. This QRS width would be the final determination as to whether or not the colt is selected or rejected, because normally only horses with defect-free large heart size may become efficient winning race horses. The selected horse is preferably placed under observation on a basic properly balanced diet formulated for the purpose of providing as much nutrient to the horse as practical from a conventional ration point of view. Once on this ration, the animal's teeth are floated, he is wormed if necessary, he is given his general regime of vaccinations for the prevention of the usual contagious diseases, and is allowed to become acclimated to his surroundings while being on this diet for approximately a week to 10 days. The reason the animal is on the diet for this period is that it allows his metabolic system to bring his blood chemistry into balance with the particular ration that he is on and in the particular environment in which he is present.

Once this horse reaches this state of normal equilibrium as it will be called, his normal weight is determined and several basic blood chemical analyses are performed to establish the individual horse's normal range for each biochemical test. These tests are as follows: total protein, albumin, globulin, SGOT, phosphorus, alkaline phosphatase, bilirubin, calcium, potassium, sodium, chloride, lactic acids, hematocrit, and hemoglobin.

Following is a brief explanation as to the reasons these chemical analysis and their use in the conditioning period. In general, theses reasons are twofold. One is that they indicate the balance of the ration or nutrition that is being utilized by the animal, and secondly they serve as an indicator to determine whether or not any tissue damage is occurring during the conditioning period to determine, prior to clinical evidence, whether the horse is being overconditioned.

Exercise is a factor in maintaining an efficient hemopeotic system or blood system; and training and racing lead to destruction of red blood cells, which in turn should serve as a stimulus for the production of new red blood cells. One would therefore expect to see an increase in serum bilirubin and a slight rise in new blood cells on a horse beginning training. From then on, under optimum conditions, these factors should reach a steady state, and any variations would require further investigation. At later stages of training, should the bilirubin remain high or show a rise, the probability of excessive exercise would be considered. A closer examination would be made of the animal's clinical appearance and his training record.

SGOT levels can be used as an indication of quantity of work being performed at any stage of training and muscle damage during training. During training, it is quite common to find marked, raised levels which rapidly return to normal as training and racing progresses. This is also seen in the fat animal when its training is too hurried, owing to a mistaken impression that the fat represents condition. A rise in SGOT levels, at the stage of normal condition, may indicate problems other than training. They should be considered important and the horse should be reevaluated.

Slightly to markedly raised alkaline phosphatase levels are considered indicative of the effects of growth hormone, and this is especially true in the 6 months to 3 year old animals. Should energy requirements at the growth period exceed the caloric intake, there will be naturally a stunting of the individual's growth. It is important then to carefully train these young animals in proportion to the amount of calories they obtain from the nutrition. Under conditions of increased stress in these animals, an excessive glucocorticoid production results. Protein catabolism and negative nitrogen balance occurs. This can be seen clinically in the form of reduced muscle mass, and very often causes horses to have a faulty gait. But if the phosphate and alkaline phosphatase levels are watched during an extreme exercise, then protein catabolism and negative nitrogen balance can be prevented.

It is especially true that a fall in serum proteins, especially the albumin fraction, is noticed in animals whose protein intake is less than normal, and also in whose nutritional diet the carbohydrate is at a low ebb or in cases where the exercise caloric requirement exceeds the caloric intake. In either of these cases the protein is broken down due to the animal's increased requirement for energy, resulting in situations mentioned above. A fall in levels of protein in the serum is always a danger sign and suggestive of failure to adapt to training in most horses.

The sodium and chloride measurements of the serum are important with respect to the animal's maintenance of proper fluid balance. These animals work very hard and sweat profusely, and in some instances are worked to the point where they become excessively dehydrated. Known sodium and chloride levels will help prevent this.

The lactic acid level is important and will be studied more extensively than any of the others in regard to the evaluation of this chemical at various periods of exercise and during various stages of exercise. It is known that increased lactic acid level is one of the causes of destruction of muscle tissue during intensive exercise, causing lameness in horses that tie up due to fatigue as a result of improper conditioning. With proper study of lactic acid simultaneously with interval swimming exercise under the invention much can be learned; and horses can be helped in their conditioning.

The hemoglobin and hemotocrit are important tests to tell us relatively how many red blood cells are present per given volume of blood, as well as how much hemoglobin or oxygen carrying capacity these red blood cells have.

Two other tests advantageously used in this particular regime of biochemistry are the potassium level and the carbon dioxide level of the blood. Potassium is an element which is very important for heart function. It also is excreted occasionally when glucocorticoid activity is at a high level in the body. Carbon dioxide level will be utilized as a measure of oxygenation efficiency of the blood as well as an indication of acid-base balance if total $CO_2$ is studied.

Once the normal physiological values in the above are obtained on each individual horse, and his electrocardiogram studied for acquainting the veterinarian with the size of the heart as well as the examination of the T-wave amplitude and position. When horses are completely out of condition, the T-wave is positive in charge and high in amplitude on a unipolar base apical lead, at rest. As the horse becomes conditioned, T-waves become negative in polarity and greater in amplitude in the negative direction. This is an important determination as to whether or not the horse is fit from the electrocardiogram standpoint.

Once the horse's physiological values are known and understood, and nutrition is balanced, the horse begins active conditioning with the swimming exercise cycle program. The horse is preferably exercised in the following manner. He is placed on an elevator platform above a body of water and restrained from appreciable movement front, rear and laterally, care being taken not to physically restrain in any way the legs or any muscles used in swimming. A heart condition meter in the form of an electrocardiograph and a heart rate meter are connected to his body by means of suction devices as will appear. His heart action is continually monitored during the entire program. He is lowered into the water until he is forced to swim and so remains until his heart is observed to attain a steady rate of approximately 200—225 beats per minute depending on the horse's normal. Instantly, at that point, the horse is raised out of the water far enough so that he may breathe as freely as possible and stop swimming. This is preferably done by raising the platform until he can stand on it. He is raised to such height that the lung cavity is completely out of the water so that there is no hydrostatic pressure against the lungs when he is in a state of oxygen debit. The recovery interval now starts. The heart rate meter and electrocardiogram are watched until his reducing heart rate reaches a point on the electrocardiograph where the T–P base line becomes discernible and the T-wave shape indicates the start of reversal. The heart rate at this point may be in the neighborhood of 100—140 beats per minute depending on the individual. Either meter may be used to determine this period. When the individual's heart rate reaches the low point the recovery interval is over and he immediately is returned to the water by lowering the platform so that he is again forced to swim until his heart rate arrives at approximately 200—225 again. In practice, the length of this recovery interval is carefully noted, as recovery rate is a barometer of the horse's condition. The whole sequence is repeated cyclically to the end of the exercise.

Once the horse enters the platform, he is automatically weighed. The horse is weighed every day or every time he swims a cycle. The reason that the horse is weighed every day or at the beginning of each swim cycle is to determine whether or not the amount of food intake or caloric intake in his diet is equaling the amount of energy calories required in training. This monitoring of the horse's weight provides a gross means of correlating the total amount of energy supplied by the food compared to the total amount of energy utilized by the exercise. The horse always loses some weight during a swim cycle due to perspiration and like fluid loss but this is usually compensated by drinking water after the exercise. The foregoing monitoring observes any real change in weight due to actual loss of body mass.

In accord with the weight monitoring, the swim cycle may be altered if the real loss of weight exceeds the food intake which is a signal that he is drawing reserve protein and other substances out of storage in his body. Therefore, the number of times a horse goes in and out of the water may be determined by maintenance of a desired weight. After a swim exercise cycle the rate of recovery of the horse's heart beat back to normal is measured and noted.

The horse is trained in this manner, depending upon the observed condition of the animal on a daily basis. Usually there is a swimming exercise cycle each day during conditioning. At the end of this time, the horse graduates from the training facility and may be moved to a maintenance facility at a track. The maintenance facility is equipped with a portable device wherein he may be lowered into a body of water for monitored swimming exercise as before. The horse can be worked, raced, trained to be rated, trained to break properly from the gate, as well as become accustomed to the natural surroundings of a racetrack. When the horse graduates to the maintenance facility, his swimming exercise is interspersed with various running workouts. The horse may not be swimming every day, but his heart action will be continually monitored at a periodic intervals to determine if the horse maintains proper condition. If not, he will be returned to the conditioning facility.

With this particular method of conditioning horses, a horse may always be maintained in condition from the time he is 6 months of age until he is through with his racing career, for all practical purposes. It does not damage the horse to be kept in constant condition as long as it needs to be kept in condition and can run. It is actually easier for a horse to be kept in condition rather than to let it down at the end of each racing schedule but the main advantage is heavy exercise can be maintained without damage to the horse's legs. The main advantage for swimming the horse in a pool at the track is that should he become lame, or should he become injured, his condition can be maintained during recovery from the injury while at the track, if it is necessary, rather than return him to the training facility.

Only a certain number of calories can be supplied to a horse in the conventional diet. The invention contemplates that a high-energy purified diet be provided so that a large number of calories may be put into a horse with a small amount of feed. This can be done on a continuous free choice basis rather than interval feeding. Thus the horse would have at his access, during a race, internal energy that he would not normally have if he were trained and raced under conventional methods.

The invention contemplates putting a high number of calories into the horses with the result that they expend high energy when called upon in a manner which would make them more fit and give them capacity for a tremendous amount of endurance that horses have not approached when trained by conventional methods.

One of the major advantages in swimming a horse for exercise is that a high heart rate can be obtained and safely maintained by this method of exercise, and it can be continually monitored so as to obtain recovery, rates at rest intervals and the use of this as a barometer of the animal's change in condition. The better the condition the more rapidly the animal returns to normal. Heart action monitoring as is obtained in the invention is moreover not possible in a running horse. A horse that is trained at a high heart rate level at periodic intervals will develop more capillaries in the muscular tissue and more venous capillaries for the return of carbon dioxide and lactic acid during exercise, thereby making a more efficient machine which will operate at greater capabilities, more efficiently, for longer periods.

BRIEF DESCRIPTION OF DRAWINGS

FIGS. 1a, 1b, 1a', 1b', 1a'', and b'' are diagrammatic views showing the monitored interval swimming exercise program according to the invention;

FIG. 2 is a diagrammatic view showing preferred placement of the measuring instrument leads on a horse undergoing the interval swimming exercise program of FIG. 1;

FIG. 3 is a specimen section of an electrocardiograph taken on a horse at rest;

FIG. 4 is a specimen section of an electrocardiograph taken during an actual exercise period of a vigorously swimming horse; and FIG. 5 shows a preferred suction cup structure used for attaching electrocardiograph or heart rate meter leads to the horse during the exercise program.

PREFERRED EMBODIMENTS

The invention in the preferred embodiments contemplates correlating adequate controlled exercise and diet of a selected animal. An animal subjected to exercise will lose weight as food is converted to useful energy. Properly controlled the exercise will utilize the food contained in the animal's diet by converting it to accomplish body building and using functions; and depending on the diet, such conversion will be more or less efficient. Excess exercise will break down difficult to rebuild muscle and body tissues and result in deteriorated condition with attendant loss of weight. In the invention the amount of exercise is so controlled that such deterioration is prevented, and this is usually done by continually monitoring the animal's heart rate and weight during exercise in accord with information derived from the foregoing analyses and tests which will indicate the acceptable heart rate and exercise-weight factors for that animal.

The invention includes the discovery that the optimum manner of controllably exercising an animal such as a horse for racing is swimming. This is mainly because swimming utilizes essentially all of the major muscles used in running, and swimming takes place in an environment wherein the horse is least subject to injury.

Swimming moreover is an exercise which causes a relatively great increase in cardiac output to supply needed oxygen to the muscles. Several factors other than the exercise itself, namely, increased heat loss, respiratory stimulation, and pressure of the water, are responsible for the greater cardiac response in this type of exercise, A large heart will be capable of handling most increased venous return caused by vigorous exercise without appreciable increase in heart rate, and therefore by increasing the rate of beat of such a heart during violent exercise such as strong swimming it maintains a constant high output adequate to handle the corresponding increased venous return, and so increase the total circulation with more blood being delivered to the capillaries to supply oxygen to the muscles for sustained effort.

In conditioning a horse as shown in FIG. 1, the animal is placed on a platform 11 elevated above a confined body of water indicated at 12 and restrained from lateral, forward and rearward movements of the platform. This restraint is applied to the upper part of the body as by straps well above the legs, or by connecting the tail to a stable bar behind the horse, so that there is no mechanical interference with normal leg movement or shoulder and upper rear leg muscles or respiratory action during swimming.

The sequence of FIGS. 1a—1b'' diagrammatically illustrates the cycle of swimming exercise under the invention. Position a indicates the start of the exercise period. This position may be above water level to enter the horse directly onto the platform.

The platform, with the animal thereon, is lowered gradually into or in the water until at the FIG. 1b position indicated at 11' submersion is such that the animal must swim to remain afloat. Swimming tends to propel the animal forwardly, but this movement is prevented by the front restraint so that effectively the animal remains longitudinally substantially in the same place while the legs move through the water.

While the animal is swimming its heart is closely monitored. The effort of swimming will cause the heart rate to rise, in proportion to the energy being exerted, and the invention includes discovery that a sustained high heart rate above a certain safe value, which value will be indicated for that animal by the foregoing physiological analyses and electrocardiograms, will result in harmful fatigue rather than beneficial conditioning.

The heart action is constantly measured during the exercise cycle by a special combination of novel body attached electrodes shown at 13 and 14 and an electrical instrument 15 capable of detecting and measurably indicating the very small generated voltages incident to heart action, in the neighborhood of one to three millivolts, such as an electrocardiograph or a heart rate meter. As will be described, the electrodes are special suction cups attached as by line 16, 17 to an external source of vacuum 18.

It is absolutely essential that there be no extraneous electrical signals to very or mask the potentials generated by heart muscle action. Therefore the electrodes 13 and 14 are preferably attached to the horse's body at the illustrated points in FIG. 2 where adjacent muscular activity is minimum notably near the top of the front shoulder and at the underside of the body near the front leg. It is further essential that the electrodes make good unvarying contact with the horse's body, and that is the function of the external vacuum which in exercises to date indicate that a vacuum of about 25 inches of mercury is satisfactory to anchor the electrodes to the body so as to prevent any static generating movement thereof relative to the body even when the horse is swimming vigorously.

As shown in FIG. 5 each vacuum line 16 (or 17) is a vinyl or like nonconducting plastic tube 21 fitted upon a stainless steel collar 22 welded air tight into an aperture in a shallow noncollapsible stainless steel cup 23. The end of a stainless steel wire 24 is welded at 25 to collar 22, and the wires 24 emerge from the tubes 21 in an insulating sheath 20 for connection to meter 15, so that the wires 24 are electrically insulated from each other between their respective electrodes and the meter. Preferably the tubes 21 of lines 16 and 17 are joined to a single tube 26 leading to a vacuum source 18, so that the vacuum is connected to simultaneously act on the electrodes.

The importance of the external suction source lies in its ability to exert sufficient force to properly anchor electrodes 13 and 14. Suction bulbs have been proposed for electrodes in human electrocardiography, but such would not be adequate for attachment to vigorously exercising horses. We know of no instance where electrocardiographs have been taken of vigorously exercising humans during exercise, so that the problems solved by this phase of the invention have never been presented or recognized.

In actual practice it was discovered that the presence of chlorine and like substances in the water containing the swimming horse resulted in sufficient electrolytic action at electrodes containing junctures of dissimilar metals to produce misleading signals in the meter leads. Hence care is taken in the invention to eliminate this difficulty, and a current solution is to use the same metal along the entire conductive path between the horse's body and the meter 15. In practice the suction cups 23 and collars 22 are formed of 316 stainless steel about 0.035 inches thick, and wires 24 are 316 stainless steel. Welding is done with a 316 stainless steel welding rod. Therefore the conductive metal composition is uniform along its entire length, and no electrolytic effects are present.

Referring to FIG. 5, it will be noted that application of vacuum to tube 21 results in the skin 27 of the horse being pulled into close conformity with the interior of the cup 23, with the sharp annular edge 26' of the cup indenting (but not cutting) the skin. This provides a good locking attachment which does not change position or become detached when the horse is swimming. We believe that such strong attachment of the electrodes and selection of regions of the horse's body which undergo little movement when the horse is exercising mutually contribute to the clarity with which the heart action signals are received during exercise.

Referring again to FIG. 1a, a weight indicating system is diagrammatically indicated at 28 connected to a scale dial 29 which can be calibrated to indicate the horse's weight directly. Weight readings are usually taken only when the platform is free of the water.

Any suitable weighing apparatus may be used and in fact the exact apparatus is independent of the method phase of the invention herein claimed. A preferred embodiment of the weighing apparatus is disclosed in our application U.S. Pat. Ser. No. 712,183, filed Mar. 11, 1968 wherein the scale dial is activated by hydraulic pressure effectively supporting the platform 11.

The measuring system including attachment of electrodes 13 and 14 is placed usually when the horse enters to position FIG. 1a and is in normal equilibrium. Then his heart rate and weight are measured, and he is lowered to swimming position FIG. 1b during which the electrodes remain attached.

In position b monitoring of the heart rate continues. As soon as the measured heart rate reaches the upper limit range (200—225 beats/minute) the platform is raised toward position 11 until the horse can find footing, is not longer swimming, is standing on the platform as shown at FIG. 1a and is breathing easier as above explained. Now the recovery interval starts and during this interval constant monitoring of the heart rate continues and the horse's rate of recovery is noted. FIG. 4 shows an electrocardiograph of the violently exercising horse, the T-wave being positive.

When the lowering heart rate reaches a predetermined range, usually about 140 beats/minute indicated on the heart rate meter, or when inversion of the T-wave from positive to negative appears as shown in FIG. 3 becomes discernible on an electrocardiogram, the platform is again lowered as at FIG. 1b' until the animal is forced to resume his swimming. The duration of the recovery interval is noted.

The foregoing is repeated several times, the animal being thus violently exercised by swimming for successive periods at high heart beat levels and allowed to partially recover between periods of exercise.

During conditioning, the horse is given this swimming exercise cycle on the average of about once a day and he is weighed each day about the same time. The swimming exercise is varied if the change in weight indicates the animal may be drawing on reserves while exercising. As training progresses and the horse becomes conditioned it will be noted that the exercise period in cycle time gradually increases and the recovery interval decreases which is an indication that endurance is increasing. Each exercise period lasts a reasonable time, usually about 3—10 minutes depending on the horse and his current condition. The conditioning period lasts about 3 to 6 weeks normally, but this may vary for individuals.

The foregoing described conditioning method is safe and humane, and it unexpectedly improves a horse's endurance capabilities. Constant monitoring of the heart rate insures that the horse never reaches the fatigue point between recovery intervals. Continual monitoring of recovery is equally important. The quicker the horse's heart rate drops from 200—225 to 140—175 during a recovery interval between swimming periods the better the horse's condition. The quicker the horse's rate recovers to the equilibrium normal following the exercise of a conditioning cycle, whether the exercise be swimming or running, the better the horse's condition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a method of controllably conditioning an animal for periods of sustained optimum physical effort such as racing, the steps of exercising said animal by swimming during periods that are spaced by nonswimming recovery intervals during which the heart rate of the animal is allowed to reduce toward but not to normal, and monitoring the heart action of said animal continually during said periods and intervals, said monitoring step comprising continually observing the instantaneous heart rate of said animal during said periods and intervals to prevent rise of said heart rate above a predetermined safe maximum range during said periods and to start each succeeding period substantially immediately following a recovery interval at a point where the heart rate of the animal is in a relative high range as compared to normal but safely below said predetermined maximum range so that during the exercise periods following the initial period the animal exercises in a relatively high above normal heart rate condition.

2. The method defined in claim 1, including the step of measuring the duration of each recovery interval for determining the animal's recovery rate during exercise as an indication of the condition of said animal.

3. The method defined in claim 1, including the step of determining the heart action recovery rate of said animal following an exercise cycle as an indication of the animal's condition.

4. In the method defined in claim 1, said monitoring step comprising continually observing the instantaneous heart rate of said animal during said periods and intervals to prevent rise of said heart rate above a predetermined safe maximum range during said periods and to resume each period following a recovery interval at a point where the heart rate of the animal is in a relative high range as compared to normal but safely below said predetermined maximum range so that during the exercise periods following the initial period the animal exercises in a relatively high heart beat condition.

5. In the method defined in claim 1 wherein the animal is a horse, each said period being terminated when the heart rate of the horse rises to a substantially sustained value within the range of about 200—225 heart beats per minute and each said interval being terminated when the heart rate of the animal drops to a substantially sustained value within the range of about 100—140 heart beats per minute.

6. The method defined in claim 1, wherein said animal is monitored by an operating electrocardiograph during said periods and intervals.

7. The method defined in claim 1, wherein said animal is monitored by an operating heart rate meter during said periods and intervals.

8. In the method defined in claim 1, said animal being placed on a platform wherein it is restrained against appreciable forward, rearward or lateral movement without interferring with respiratory action or the legs or swimming muscles, which platform cyclically is lowered into a body of water sufficiently that the animal must swim to stay afloat during the exercise periods and raised sufficiently to enable the animal to stand thereon during said recovery intervals.

9. In the method defined in claim 1, said monitoring step including the secure attachment of at least one electrical potential measuring lead to a surface region of the animal's body that undergoes little or no muscle derived movement during exercise.

10. In the method defined in claim 1, said monitoring step including the secure attachment of at least one electrically conductive suction-cup electrode to a surface region of the body of the animal, and applying an external source of vacuum to said cup.

11. In the method defined in claim 1, the steps of determining the normal heart rate and weight factors for a particular animal prior to said conditioning steps.

12. In the method defined in claim 1, the length of each recovery interval being determined by recovery of the animal to a predetermined higher than normal heart rate range and serving as an indication of the condition of said animal.

13. In the method defined in claim 1, the step of measuring the heart recovery rate of the animal to normal after an exercise cycle as an indication of the condition of said animal.

14. A method for training animals as for racing and accomplishing an exercise session comprising: the application of means to an animal for sensing heart cycle action, causing said animal to exercise strenuously by swimming in place while observing the animal's heart rate during exercise and continuing said exercise until the heart action of the animal reaches a safe predetermined maximum high rate range, then resting the animal for a first nonswimming recovery interval during which observation of the animal's heart action is continued until said rate decreases and until a partial recovery condition of the animal is apparent from said observation, said partial recovery being denoted by return of said heart rate to a range that is appreciably below said maximum but is appreciably above the normal of the animal and successively repeating said steps of exercise until the heart rate again approaches said maximum rate range and resting the animal, each exercise period after the initial period being started while the animal is in a partial recovery condition.

15. The method defined in claim 14 wherein said animal is a horse and the maximum heart rate is the range of 200—225 cycles per minute.

16. The method defined in claim 14, wherein observation of the animal's heart rate is accomplished by attachment of an electrocardiograph producing a continuous record of heart action, and said partial rest condition is noted from the electrocardiograph.

17. The method defined in claim 14, wherein the animal is forced to swim during the exercise periods and is allowed to remain stationary during said rest periods.

18. A method of controllably conditioning horses for periods of sustained physical effort such as racing comprising the immediately successive steps of exercising the horse by swimming in place for a period while continually monitoring its heart action, terminating said period when the heart rate of the swimming horse substantially attains a maximum safe high range by providing a support on which the horse may stand during a recovery interval wherein its heart rate is allowed to reduce toward normal, continuing to monitor said heart action during the recovery interval, and immediately removing said support to start a further swimming exercise period as soon as said reducing heart rate has reached an exercise range appreciably below said maximum safe range but well above said normal.